(12) United States Patent
Tuckfield et al.

(10) Patent No.: US 7,869,926 B2
(45) Date of Patent: *Jan. 11, 2011

(54) FIXED SPEED OPERATION IN A HYBRID TRANSMISSION

(75) Inventors: Christopher A. Tuckfield, Beverly Hills, MI (US); Konstantin Neiss, Birmingham, MI (US)

(73) Assignees: Chrysler Group LLC, Auburn Hills, MI (US); GM Global Technology Operations, Detroit, MI (US); Daimler AG, Stuttgart (DE); Bayerische Motoren Werke Aktiengesellschaft, Munich (DE)

( * ) Notice: Subject to any disclaimer, the term of this patent is extended or adjusted under 35 U.S.C. 154(b) by 968 days.

This patent is subject to a terminal disclaimer.

(21) Appl. No.: 11/612,561

(22) Filed: Dec. 19, 2006

(65) Prior Publication Data

US 2008/0147284 A1 Jun. 19, 2008

(51) Int. Cl.
*G06F 7/00* (2006.01)
(52) U.S. Cl. .................. 701/56; 701/22; 701/51; 477/3; 475/131
(58) Field of Classification Search .................. 701/52, 701/56, 51, 50, 67, 22; 477/3, 79, 122, 34; 475/131, 132
See application file for complete search history.

(56) References Cited

U.S. PATENT DOCUMENTS

| 5,947,861 | A | 9/1999 | Nobumoto |
| 6,033,338 | A | 3/2000 | Jackson et al. |
| 6,086,506 | A | 7/2000 | Petersmann et al. |
| 6,199,003 | B1 | 3/2001 | Hollingsworth et al. |
| 6,671,602 | B1 | 12/2003 | Speicher et al. |
| 7,505,842 | B2 * | 3/2009 | Luh ........................... 701/55 |
| 2003/0199353 | A1 * | 10/2003 | Bowen ........................ 475/5 |
| 2005/0072255 | A1 | 4/2005 | McCrary et al. |
| 2005/0080540 | A1 | 4/2005 | Steinmetz et al. |
| 2005/0080541 | A1 * | 4/2005 | Sah et al. ...................... 701/67 |
| 2005/0137042 | A1 | 6/2005 | Schmidt et al. |
| 2005/0245350 | A1 | 11/2005 | Tabata et al. |
| 2006/0006008 | A1 | 1/2006 | Brunemann et al. |
| 2006/0195242 | A1 | 8/2006 | Yamamoto et al. |

* cited by examiner

*Primary Examiner*—Gertrude Arthur Jeanglaud
(74) *Attorney, Agent, or Firm*—Ralph E. Smith (57) ABSTRACT

A method of operating a hybrid transmission includes controlling the transmission according to a drive mode, which includes a continuously variable speed relationship, and controlling the transmission according to a fixed speed relationship mode, which includes a plurality of fixed speed relationships including mechanical gear ratios and virtual gear ratios.

17 Claims, 6 Drawing Sheets

FIXED SPEED OPERATION IN A HYBRID TRANSMISSION

FIELD OF THE INVENTION

The present invention relates generally to vehicle transmissions, and more particularly to hybrid transmissions.

BACKGROUND OF THE INVENTION

A conventional automotive vehicle includes a drivetrain to generate mechanical power and impart the power against a road surface to propel the vehicle. A "hybrid" powertrain commonly includes a transmission coupled to at least two different prime movers such as a mechanical engine and an electrical motor. A series hybrid powertrain generally includes an engine driving a generator, which is coupled to a battery and an electric motor that propels the vehicle. A parallel hybrid, powertrain commonly includes an engine and a motor both mechanically coupled to a drivetrain, which includes a discrete gear shifting, transmission with fixed gear ratios. A mixed hybrid powertrain typically includes the elements of the series and parallel hybrid powertrains in any of several configurations. Mixed hybrid powertrains now include continuously variable transmissions having planetary gears and integrated electric motors selectively coupled to the planetary gearsets, which are also selectively coupled to an engine.

SUMMARY OF THE INVENTION

In one implementation of a presently preferred method of operating a hybrid transmission, the transmission is controlled according to a drive mode, which includes a continuously variable speed relationship, and according to a fixed speed relationship mode, which includes a plurality of fixed speed relationships including mechanical gear ratios and virtual gear relationships. According to a preferred aspect, a driver request is received to upshift or downshift from the continuously variable speed relationship mode to the fixed speed relationship mode, and the transmission is thereafter shifted into the fixed speed relationship mode.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
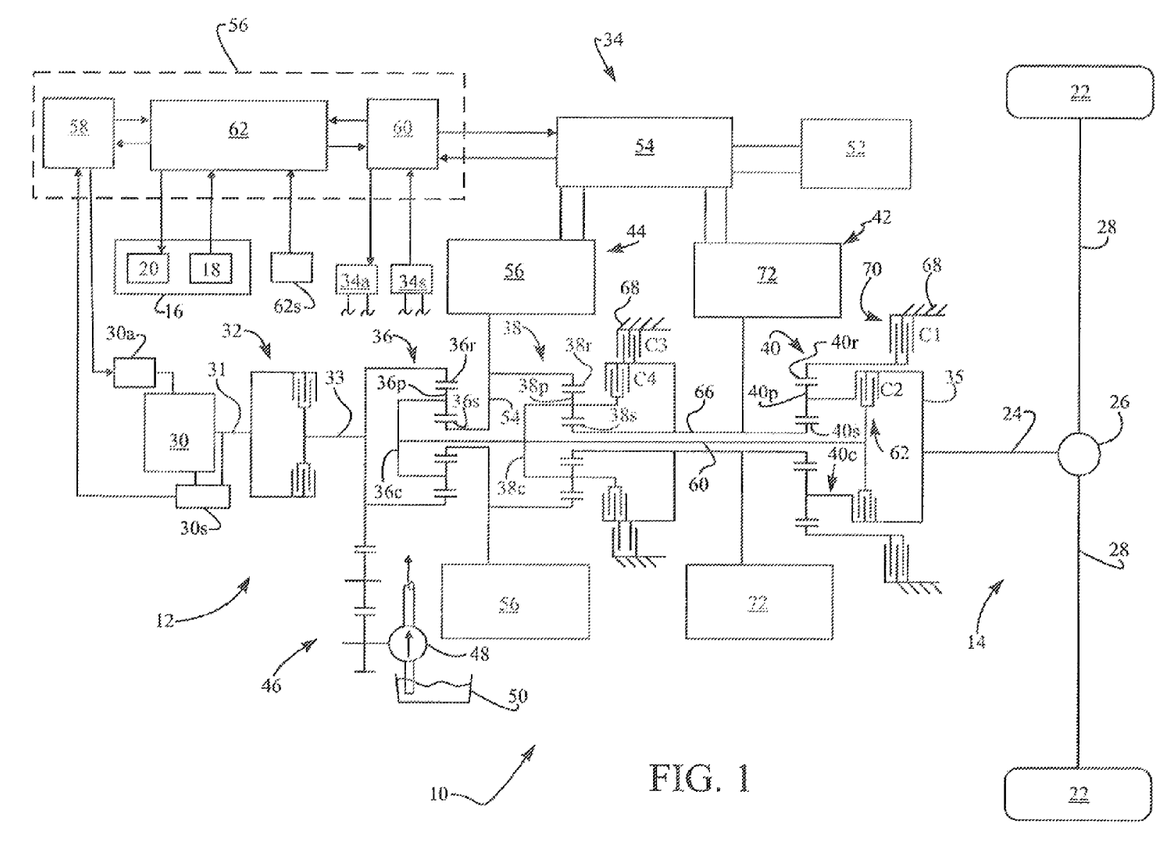
FIG. 1 is a schematic of one exemplary embodiment of a vehicle drivetrain system including an exemplary hybrid powertrain having an exemplary engine and an exemplary hybrid transmission.

Referring in more detail to the drawings, FIG. 1 illustrates an exemplary drivetrain system 10 for propelling a vehicle. The drivetrain system 10 generally includes a hybrid powertrain 12 to generate mechanical power, and a driveline 14 to convey the mechanical power from the powertrain 12 against a road surface to propel the vehicle down the road. The drivetrain system 10 can also include or communicate with a driver interface 16 for receiving input from and transmitting output to a vehicle driver.

The driver interface 16 generally can include any suitable input devices 18 to receive commands or requests from the driver and output devices 20 to transmit drivetrain information back to the driver. The output devices 20 of the driver interface 16 can include a mode selection display to indicate transmission modes such as P for Park, R for Reverse, N for Neutral, D for Drive m a continuously variable (CV) speed relationship mode (aka Drive mode), AF for an automatic fixed speed relationship mode, and MF for a manual fixed speed relationship mode. The MF display of the driver interface output devices 20 can also include a plurality of fixed speed relationship displays. As will be discussed in detail below, the manual fixed speed relationship mode enables a driver to instruct die powertrain 12 to perform more aggressively and to take control of transmission shifts.

The driver interface input devices 18 can include an accelerator pedal and related sensor(s), a brake pedal and related sensor(s), and/or any other like device for controlling the powertrain, such as a transmission mode selector and related sensor(s) to receive requests from the driver for different modes of transmission operation. The mode selector can include a steering-column-mounted or console-mounted gearshift lever, push buttons, a touchscreen graphical user interface, or the like. The transmission mode selector can include settings for transmission modes such as P for Park, R for Reverse, N for Neutral, D for Drive in a continuously variable speed relationship mode, AF for an automatic fixed speed relationship mode, and MF for a manual fixed speed relationship mode. The transmission mode selector can also include a plurality of fixed speed relationship settings and corresponding sensors, or can include a +/− selector including a "+" and "−" settings and sensors corresponding to driver-requested upshifts and downshifts. The +/− selector can instead be a separate device such as a paddle, or pushbutton switch, or the like, and can include related sensors.

The driveline 14 can include any suitable apparatus for transmitting torque from the hybrid powertrain 12 to the road. For example, the driveline 14 generally may include tired wheels 22 for contacting the road, and a driveshaft 24 coupled to the powertrain 12 for receiving torque therefrom. The driveline 14 may also include a final drive unit 26, such as an axle or differential, coupled between the driveshaft 24 and the wheels 22, for example, to change direction of and multiply the torque received from the powertrain 12 and to deliver it to the wheels 22 via axle shafts 28 or the like.

In general, the hybrid powertrain 12 includes any suitable configuration of different types of prime movers to convert some form of energy into mechanical force and motion, and one or more transmissions coupled to the prime movers to multiply torque received from the prime movers. But in a particularly preferred example shown in FIG. 1, the hybrid powertrain 12 can include a first external prime mover, such as an internal combustion engine 30 selectively coupled via a selective coupling 32 to a hybrid transmission 34.

The engine 30 can be any suitable engine such as a diesel engine, gasoline engine, or the like. In any case, the engine 30 includes an output shaft such as a crankshaft 31 for coupling to the transmission 34. The first prime mover 30 can also include various actuators 30a and sensors 30s, including throttles and fuel injectors and related sensors, and further including speed sensors, manifold air pressure sensors, and the like.

The hybrid transmission 34 can be any suitable device to produce a continuously variable speed relationship in addition to fixed speed relationships between a transmission input 33 and a transmission output 35. For example, the hybrid transmission 34 can be an electrically variable transmission, which, by now, is a known type of transmission to those skilled in the art. The transmission 34 generally includes one or more mechanical speed reducers, such as gearsets 36, 38, 40, to multiply prime mover torque, and one or more integrated prime movers 42, 44, such as electric motors, mechanically coupled to the speed reducer(s) 36, 38, 40 to impart motor torque thereto and/or absorb engine or vehicle inertial torque therefrom. As used herein, the term electric motor includes any suitable electric machine such as a motor, generator, or a combined motor/generator.

The gearsets 36, 38, 40 can be any suitable device(s) to receive and multiply torque from the prime movers 30, 42, 44 to adjust powertrain speed relationships and thereby adjust powertrain torque for output to the driveline 14. For example, the gearsets 36, 38, 40 can include planetary gearsets, which are generally well known to those skilled in the art. Any suitable number of gearsets can be used, but the exemplary transmission 34 includes three gearsets including an input gearset 36 coupled to the transmission input 33 in any suitable manner, a final gearset 40 coupled to the transmission output 35 in any suitable manner, and an intermediate gearset 38 coupled between the Input and final gearsets 36, 40. The planetary gearsets 36, 38, 40 can include centrally disposed sun gears 36s, 38s, 40s, ring gears 36r, 38r, 40r generally circumscribing the sun gears 36s, 38s, 40s, and planetary gear carriers 36c, 38c, 40c between the sun gears 36s, 38s, 40s and ring gears 36r, 38r, 40r. The carriers 36c, 38c, 40c can include a plurality of planet gears 36p, 38p, 40p in mesh between the sun gears 36s, 38s, 40s and ring gears 36r, 38r, 40r, such that the planet gears 36p, 38p, 40p orbit their respective sun gears 36s, 38s, 40s when the carriers 36c, 38c, 40c rotate relative thereto. Those skilled in the art will recognize that the gearsets 36, 38, 40 can define any suitable mechanical gear ratios using any suitable numbers of gear teeth on the various gears and being coupled in any suitable manner to one another.

The gearsets 36, 38, 40 can be coupled together and to other transmission elements in any suitable configuration using any suitable devices. For example, any combination of shafts, hubs, drums, or the like can be fixed in any suitable manner between different elements of the different gearsets or can be selectively coupled thereto such as by selective couplings or the like. Any suitable number and type selective couplings can be used, such as four selective couplings C1-C4, which can include friction plate clutches, brake bands, and/or the like. The input ring gear 36r is fixed to the transmission input 33 and to an auxiliary drive 46 for driving any suitable auxiliary device such as an oil pump 48 for pressurizing transmission oil from a sump 49 for delivery to, and actuation of, the selective couplings 32, C1-C4, and other suitable portions of the transmission 34. The input sun gear 36s is fixed to the intermediate ring gear 38r, and the input carrier 36c is fixed to the intermediate carrier 38c and selectively coupled to the final carrier 40c through a second CV mode selective coupling C2. The intermediate sun gear 38s is fixed to the final sun gear 40s, and selectively coupled to its own intermediate carrier 36c through a $1^{st}/3^{rd}$ gear coupling C4 and to a transmission housing through a $4^{th}$ gear coupling C3. Finally, the final ring gear 40r is selectively grounded to a transmission support 50 such as a housing, center support, rear support, or the like, through a first CV mode selective coupling C1, and the final carrier 40c is selectively coupled to the output 35 through the second CV mode coupling C2.

The integrated prime movers 42, 44 can include any suitable electric motors such as three phase motors, like a first CV mode motor 42 and a second CV mode motor 44. The integrated prime movers 42, 44 are integrated into the transmission 34 in any suitable manner, and coupled to the gearsets 36, 38, 40 in any suitable manner. Those skilled in the art will recognize that the motors 42, 44 can include wound stators grounded to the transmission housing 50 and rotors fixed to respective transmission components in any suitable manner. For example, the first CV mode motor 42 is fixed to the final and intermediate sun gears 40s, 38s, and the second CV mode motor 44 is fixed to the input sun gear 36s and intermediate ring gear 38r. Further, a source of electrical power 52 is coupled in any suitable manner to the motors 42, 44 and can include one or more batteries, fuel cells, capacitors, and/or the like. Also, one or more suitable motor controllers 54 are suitably coupled between the power source 52 and the motors 42, 44 and may include any suitable DC/AC power inverter.

Finally, the hybrid transmission 34 can include any suitable actuators 34a and sensors 34s. For example, the transmission actuators 34a can include variable-force, pulse-width-modulated, and/or on-off solenoid valves, or the like. Also, the transmission sensors 34s can include level sensors, pressure sensors, temperature sensors, speed sensors such as input and output speed sensors, or the like.

Still referring to FIG. 1, a powertrain control system 56 includes the engine 30 and an associated engine controller 58, the hybrid transmission 34 and an associated transmission controller 60, and a central or supervisory controller 62 in communication with the engine and transmission controllers 58, 60. Alternatively, those of ordinary skill in the art will recognize that any combination of any of the controllers 58, 60, 62 could be integrated together. Those of ordinary skill in the art will also recognize that the control system 56 may include any suitable electronic device(s) for receiving, storing, and transmitting data, and receiving, storing, and executing software program instructions and may include any suitable memory and processor devices and ancillary devices such as clocks, timers, interfaces, and/or the like. The data and program instructions can include engine operational algorithms or maps and related data, and transmission shift, schedules or speed relationship algorithms and related data, and the like.

The engine controller 58 is configured to control operation of the engine 30 by receiving suitable engine condition input signals, also by executing suitable engine control programs, and by generating suitable engine control output signals back to the engine 30. More specifically, the engine controller 58 may receive input signals from the various engine sensors 30s such as the throttle sensor and the speed sensor. The engine controller 58 may then execute suitable engine control programs to generate engine control output signals to the various engine actuators 30*a* such as the throttle and feel injectors to adjust operation and output of the engine 30 such as by suitably regulating fuel and spark parameters to activate and run the engine 30.

The transmission controller 60 is configured to control operation of the transmission 34 by receiving suitable transmission condition input signals, also by executing suitable programs based on such input, and by generating suitable transmission control output signals back to the transmission 34. More specifically, the transmission controller 60 may receive input signals from the various transmission sensors 34*s*, such as input and output speed sensors and hydraulic pressure sensors. The transmission controller 60 may then execute suitable transmission shift schedules or speed relationship algorithms to generate output signals to die various transmission actuators 34*a* such as transmission speed relationship change devices such as the selective couplings 32, C1-C4. For example, the transmission controller 60 may control electro-hydraulic solenoid valves disposed within hydraulic circuits in the transmission for activating and deactivating the selective couplings C1-C4 to couple and decouple the planetary gearsets 36, 38, 40 and thereby effect changes in mechanical and/or virtual gear relationships. In addition, the transmission controller 60 may send appropriate signals to the motor controller 54 to adjust motor speed and/or torque settings to effect changes in a continuously variable speed relationship and/or virtual gear relationships or to adjust generator settings to absorb torque from the engine or driveline in battery charging or regenerative braking modes.

The supervisory controller 62 can monitor torque and/or speed demand on the powertrain 12 and control the engine 30 and/or transmission 34 in accordance with such demand. In general, the supervisory controller 62 is configured to communicate with the engine and transmission controllers 58, 60, and control functionality of the controllers 58, 60 by receiving suitable input signals therefrom and any other suitable vehicle sources, also by executing suitable programs based on such input, and by generating suitable control output signals back to the controllers 58, 60. More specifically, the supervisory controller 62 may receive input signals from various sensors 62*s*, such as a vehicle ignition switch, an accelerator sensor, a vehicle speed sensor, a transmission mode selector sensor, a vehicle brake sensor, and/or other like input sources. The supervisory controller 62 may then execute suitable powertrain control programs to generate suitable output signals to the controllers 58, 60. In any case, the supervisory controller 62 and/or the other controllers 58, 60 can control engine throttle and fuel injection to adjust speed and torque output of the engine 30, the coupling and decoupling of the engine coupling 32, and coupling and decoupling of the transmission couplings C1-C4 and/or control of the motors to effect changes in transmission speed relationship. To determine the proper speed relationship for the transmission 34, the control system 56 may analyze a number of factors, which can include a current speed relationship of the transmission 34, a current speed of the vehicle, engine throttle position, and engine output speed. To determine the present speed relationship in which the transmission 34 is operating, the transmission input speed, or engine output speed, is compared to the transmission output speed.

In operation, the transmission 34 generally multiplies torque received from the engine 30 and enables several general modes of operation, including reverse R, neutral N, park P and various forward modes with continuously variable and fixed speed relationships such as D for Drive in the continuously variable speed relationship mode, AF for the automatic fixed speed relationship mode, and MF for the manual fixed speed relationship mode. Speed relationships are correspondences of transmission output speeds to input speeds and are indicative of the rotational "leverage" the transmission 34 provides to launch the vehicle to a desired operating speed from standstill, and vice-versa. The higher the speed relationship, the greater the leverage provided, and vice-versa.

The hybrid transmission provides both a continuously variable speed relationship and several fixed speed relationships. The speed relationships can be provided according to several specific modes of operation including two CV speed relationship modes, and the automatic or manual fixed speed relationship modes. The CV speed relationship modes are carried out to balance between powertrain operating efficiency and powertrain performance, primarily by varying the output of the motors 42, 44 and maintaining a substantially constant output of the engine 30. In contrast, the automatic fixed speed relationship mode is carried out, for example, to provide the feel of conventional automatic transmission shifts and/or to balance between powertrain operating efficiency and powertrain performance, primarily by adjusting between the planetary gearsets 36, 38, 40 driven primarily by the engine 30 and by the motors 42, 44. Similarly, the manual fixed speed relationship mode is carried out, for example, to respond to driver demand to manually control gear shifts of the transmission 34 for aggressive transmission operation and/or for the feel of a manual transmission.

Figure 2:
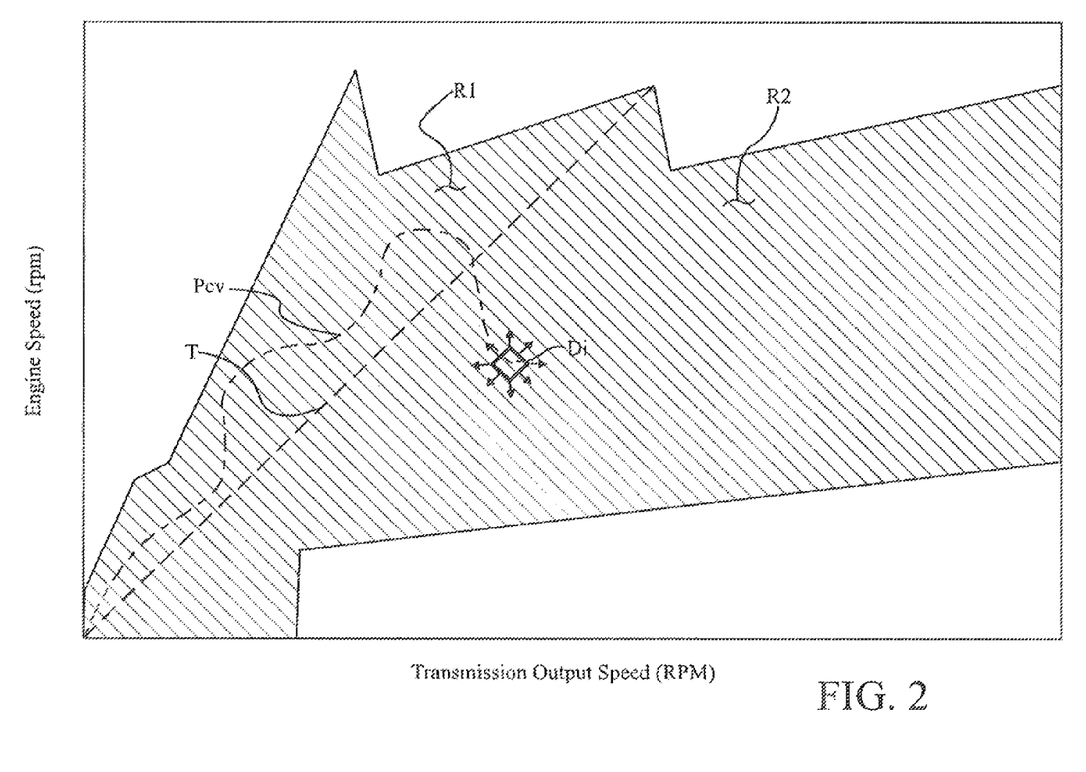
FIG. 2 is a plot of engine speed versus transmission output speed for the hybrid powertrain of FIG. 1 and illustrates an exemplary continuously variable speed relationship path within an operating range of a continuously variable speed relationship.

Referring now to FIGS. 1 and 2, the two CV speed relationship modes are carried out to balance powertrain efficiency performance via a mix of mechanical and electrical advantage or by electrical advantage only. FIG. 2 illustrates transmission output speed versus engine speed, which is substantially the same as transmission input speed when the engine 30 and transmission 34 are coupled via the selective coupling 32. As shown in FIG. 2, a shaded area Is bounded at the left and top by a maximum speed relationship limit and represents a possible speed relationship operating range within the driver-selected Drive mode D. An exemplary instantaneous speed relationship $D_i$ represents an exemplary speed relationship at a given moment in time while in the CV Drive mode D, and the dashed line indicates an exemplary continuously variable path $P_{CV}$ of speed relationships that was established prior to the speed relationship $D_i$. The arrows emanating from the speed relationship $D_i$ indicate that the speed relationship $D_i$ can instantaneously change in any direction, depending on vehicle performance conditions and powertrain demand.

The CV speed relationship modes provide a continuously variable speed relationship over a wide range such as from about 6.0 to about 0.6. A mode transition line T is shown dividing the CV speed relationship range into a low speed or first CV speed relationship range R1 correspond to a first CV speed relationship mode, and a high speed or second CV speed relationship range R2 corresponding to a second CV speed relationship mode. Both modes are primarily carried out by suitable control of the motors 42, 44 to provide a continuously variable speed relationship within and across the CV speed relationship ranges R1, R2.

The first CV speed relationship mode is achieved when the first CV mode coupling C1 is applied in order to ground the final ring gear 40*r* and the second CV mode coupling C2 is released, whereas the second CV speed relationship mode is achieved when the first CV mode coupling C1 is released and the second CV mode coupling C2 is applied in order to couple the final carrier 40*c* to the other carriers 36*c*, 38*c*. The mode transition line T is defined by a mechanical gear ratio MG3 between the first and second CV speed relationship modes that is established when both the first and second CV mode couplings C1, C2 are applied. An exemplary speed relationship may range, from about 6.0 to about 1.6 for the first CV speed relationship mode, and from about 1.6 to about 0.6 for the second CV speed relationship mode. Thus, a transition from the first to the second CV speed relationship mode can be considered an upshift, and vice-versa.

In the first CV speed relationship mode, and when the control system 56 determines that the driver desires to move forward from a stationary condition, and/or to accelerate from any vehicle speed, the engine coupling 32 is engaged to couple the engine 30 to the hybrid transmission 34, and the engine coupling 32 remains applied as the vehicle moves forward. Also, the first CV mode coupling C1 is applied, and the second CV mode coupling C2 is not applied and/or remains disengaged. The engine 30 applies driving power through the engine coupling 32 to the transmission input 33 and to the input ring gear 36r. Also, the first motor 42 can operate as a motor to drive the final sun gear 40s to rotate the final carrier 40c against the grounded final ring gear 40r to effect forward movement of the vehicle. The first motor 42 rotation also drives the intermediate sun gear 38s to rotate the input and intermediate carriers 36c, 38c in unison, and the engine 30 drives the input ring gear 36r to rotate the connected input sun gear 36s and intermediate ring gear 38r. As a result, the second motor 44 is driven by rotation from die engine 30 and/or the first motor 42 and, thus, can act as a generator. The first CV speed relationship mode can extend over a vehicle speed range from the vehicle at rest to a forward vehicle speed anywhere from about 20 to 70 MPH. At vehicle speeds greater than about 20 to 70 MPH, the transmission operates in the second CV speed relationship mode.

In the second CV speed relationship mode, one or the other of the first and second motors 42, 44 operates as a motor to drive one or the other of the final sun gear 40s or the final carrier 40c through the second CV mode coupling C2 such that the final carrier 40c rotates to effect forward movement of the vehicle. For example, the first motor 42 continues to operate as a motor until the vehicle reaches a speed anywhere from about 30 to 90 MPH, at which point it can transition to operation as a generator, and can continue thereafter to operate as a generator. Conversely, the second motor 44 continues to operate as generator until the vehicle reaches a speed anywhere from about 30 to 90 MPH and thereafter operates as a motor. Those skilled in the art will recognize that the vehicle speed ranges covered by the two CV modes are defined by the selected individual planetary gear ratios, which are based on interconnections of the planetary gearsets and the relative number of selected gear teeth between the sun, ring, and planet gears thereof. Similarly, such gear ratio selections define whether the motors 42, 44 operate as motors or generators or whether they freewheel or stand still at any given moment in any given application.

Figure 3:
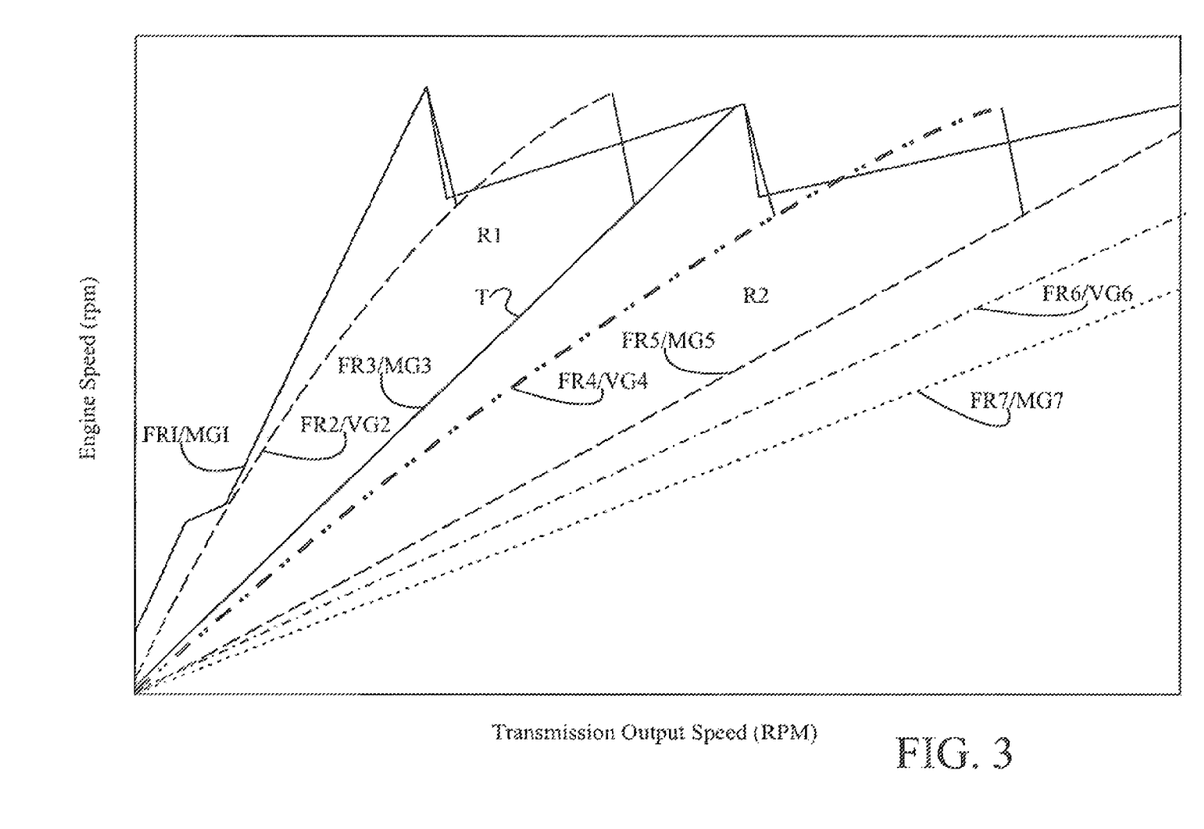
FIG. 3 is a plot of engine speed versus transmission output speed for the hybrid powertrain of FIG. 1, including plots of fixed speed relationships including mechanical gear ratios and virtual gear relationships.

Referring now to FIGS. 1 and 3, the manual fixed speed relationship mode includes several fixed speed relationships, including mechanical gear (MG) ratios and virtual gear (VG) relationships. The mechanical gear ratios and virtual gear relationships include four mechanical gear ratios and three virtual gear relationships to establish the hybrid transmission 34 as a virtual seven-speed, transmission. As shown in FIG. 3, the fixed speed relationships can overlap the speed relationship ranges of the CV speed relationship modes. Table 1 is a table of fixed speed relationships Including conventional 7-speed transmission mechanical gear ratios compared to exemplary mechanical gear ratios and virtual gear relationships of the present exemplary hybrid transmission 34. As used herein, the terminology speed relationship includes a constant linear relationship between input and output, speeds such as 3.89, and further includes a non-linear relationship between input and output speeds that can follow a fixed curved path between boundaries such as 3.50 to 2.33 or 1.61 to 1.26. Accordingly, the mechanical gear ratios and virtual gear relationships FR1-FR7 are Illustrated as straight and curved lines in FIG. 3.

TABLE 1

| Conventional 7-Speed Transmission Fixed Speed Ratios | Hybrid Transmission Fixed Speed Relationships | Fixed speed relationship #/ Mechanical or Virtual Gear # | Selective Couplings Applied |
|---|---|---|---|
| 4.377 | 3.89 | FR1/MG1 | C1/C4 |
| 2.859 | 3.50-2.33 | FR2/VG2 | C1 |
| 1.921 | 1.80 | FR3/MG3 | C1/C2 |
| 1.361 | 1.61-1.26 | FR4/VG4 | C2 |
| 1.0 | 1.00 | FR5/MG5 | C2/C4 |
| 0.82 | 0.85 | FR6/VG6 | C2 |
| 0.728 | 0.72 | FR7/MG7 | C2/C3 |

A virtual gear relationship is a fixed speed relationship within one or the other of the CV speed relationship modes, wherein speed of one or both of the motors 42, 44 is controlled according to a fixed relationship to transmission output speed. For example, the engine speed can be controlled by the speed of the motors, wherein the relationship therebetween is approximately as follows: Engine Speed=0.5×first mode motor speed+0.5×second mode motor speed. The engine 30 can be commanded to produce a torque to achieve optimum operation for a given battery state and desired transmission output torque. The motors 42, 44 are then controlled to produce the torque required to achieve a desired battery power, and transmission output torque as well as additional torque to accelerate (or decelerate) the motors 42, 44 to the desired speed. This motor control thereby controls the engine 30 to the desired speed as well. The fixed speed relationship can be linear such as represented by a straight line, but can also be non-linear such, as represented by a fixed curve. The couplings C1-C4 are not intentionally slipped or partially engaged with one another to achieve the virtual gear relationships.

A mechanical gear ratio is one in which power input to the transmission 34 is transmitted through a mechanical path in the transmission 34 such as through the planetary gearsets 36, 38, 40 and coupling elements C1-C4. For example, any suitable number of mechanical gear ratios can be provided depending on the quantities and configurations of planetary gearsets and couplings used. As shown, however, at least four mechanical gear ratios can be provided with the illustrated configuration of three planetary gearsets 36, 38, 40 and four couplings C1-C4, all of which gear ratios are primarily driven by the engine 30 to provide primarily mechanically driven and substantially discrete speed relationships. The mechanical gear ratios mode is achieved when the first CV mode coupling C1 is applied in addition to one or more of the other selective couplings C2, C3, or C4 being applied. When such an additional coupling is applied, a fixed transmission input to output speed relationship is achieved. In mechanical gear ratios, the rotation of the motors 42, 44 is then proportionally set to the transmission input speed and dependent on rotation of the planetary gearsets 36, 38, 40 as set by applications of the various couplings C1-C4. But the motors 42, 44 still can function as motors or generators and, for instance, during acceleration in a first fixed speed relationship, power from both the engine 30 and at least one of die motors 42, 44 can be additive in propelling the vehicle.

To achieve a first fixed speed relationship FR1 in the form of a mechanical gear ratio MG1, the $1^{st}/3^{rd}$ coupling C4 is applied while the first CV mode coupling C1 remains applied. Thus, the first fixed speed relationship FR1 is defined by the final planetary gear set 40, wherein the $1^{st}/3^{rd}$ coupling C4 locks up the input and intermediate planetary gearsets 36, 38, such that the input and intermediate planetary gearsets 36, 38 and both motors 42, 44 rotate at the transmission input speed. This coupling C4 also provides the ability for the engine 30 and both motors 42, 44 to all three simultaneously propel the vehicle for maximum acceleration. As shown in FIG. 3, the first fixed, speed relationship FR1 can be the leftmost boundary of the variable speed relationship range of the first CV mode, and an exemplary value is 3.89.

A second fixed speed relationship FR2 Is achieved In die form of a virtual gear relationship VG2 by disengaging the $1^{st}/3^{rd}$ coupling C4 while maintaining application of the first CV mode coupling C1 to re-enter the first CV mode, and operating the first motor 42 according to a fixed relationship to transmission output speed. The second fixed speed relationship VG2 is within the variable speed relationship range of the first CV mode. The second fixed speed relationship VG2 need not be linear. In other words, the second fixed speed relationship VG2 can be non-linear in the form of a curve defined by an equation, table of values, or the like. For example, as shown in FIG. 3, the second fixed speed relationship VG2 can take the form of a fixed curve bounded by exemplary ratios of 3.50 and 2.33, which range serves to bridge a relatively wide gap between the first and third mechanical gear ratios MG1, MG3. As also shown in FIG. 3, the relationship VG2 can extend beyond the upper limit of the CV speed relationship ranges R1 and R2 for additional transmission torque output.

A third fixed speed relationship FR3 Is achieved in the form of a mechanical gear ratio MG3 by disengaging the $1^{st}/3^{rd}$ coupling C4 and applying the second CV mode coupling C2 while maintaining application of the first CV mode coupling C1. Thus, all three planetary gearsets 36, 38, 40 are active to collectively define the third fixed speed relationship FR3. The motors 42, 44 may be deactivated to freewheel when the first and second CV mode couplings C1, C2 are applied for fully mechanical operation. The third fixed speed relationship FR3 can also define the interface or transition line T between the first and second CV speed relationship modes, wherein the first CV speed relationship mode is defined, above and to the left of the transition line T and the second CV speed relationship mode is defined below and to the right of the transition line T. An exemplary ratio is 1.80.

The transmission 34 can be operated in the second CV speed relationship range R2 according to the fixed speed relationship mode. For example, the transmission 34 can be upshifted from the second CV speed relationship mode to a mechanical gear ratio within the second CV speed relationship mode range R2 such as where the driver moves the gearshift selector to a fixed speed relationship mode setting from a CV speed relationship mode setting, in another example, the transmission 34 can be up-shifted from the third fixed speed relationship FR3 to a fourth, fixed speed relationship FR4.

The fourth fixed speed relationship FR4 Is achieved in the form of a virtual gear relationship VG4 by disengaging the first CV mode coupling C1 and applying the second CV mode coupling C2, and operating the first motor 44 as a motor according to a fixed relationship to transmission output speed. The fourth fixed speed relationship FR4 is within the second CV speed relationship range R2. The fourth fixed speed relationship FR4 need not be linear and, instead, can be non-linear such as in the form of a curve defined by an equation, table of values, or the like. For example, as shown in FIG. 3, the fourth fixed speed relationship FR4 can take, the form of a fixed curve bounded by exemplary speed ratios of 1.61 and 1.26, which range bridges a gap between the third mechanical gear ratio MG3 and a fifth mechanical gear ratio MG5. Moreover, any of the virtual gear relationships VG can similarly be defined in non-linear, but fixed, terms. As also shown in FIG. 3, the relationship FR4 can extend beyond the upper limit of the CV speed relationship ranges R1, R2 for additional transmission torque output.

A fifth fixed speed relationship FR5 is achieved in the form of the mechanical gear ratio MG5 by simultaneously applying the second CV mode coupling C2 and the $1^{st}/3^{rd}$ coupling C4, which action locks the planetary gearsets 36, 38, 40 into a 1:1:1 ratio so that the transmission output 35 rotates at the same speed as the transmission input 33. As shown in FIG. 3, the fifth fixed speed relationship FR5 is represented by a straight line within the second CV speed relationship range R2.

A sixth fixed speed relationship FR6 is achieved in the form of a virtual gear relationship VG6 by disengaging the $1^{st}/3^{rd}$ coupling C4 and maintaining application of the second CV mode coupling C2, and operating the second motor 44 as a motor according to a fixed relationship to transmission output speed. The sixth fixed speed relationship FR6 is within the second CV speed relationship range R2 and an exemplary relationship is 0.85.

A seventh fixed speed relationship FR7 is achieved in the form of a mechanical gear ratio MG7 by applying the second CV mode coupling C2 and the $4^{th}$ coupling C3 to provide a fixed overdrive ratio wherein the input and intermediate planetary gear sets 36, 38 are active, and the motors 42, 44 may freewheel with no torque present. The seventh fixed speed relationship FR7 is within the second CV speed relationship range R2 and an exemplary ratio is 0.72.

Figure 4:
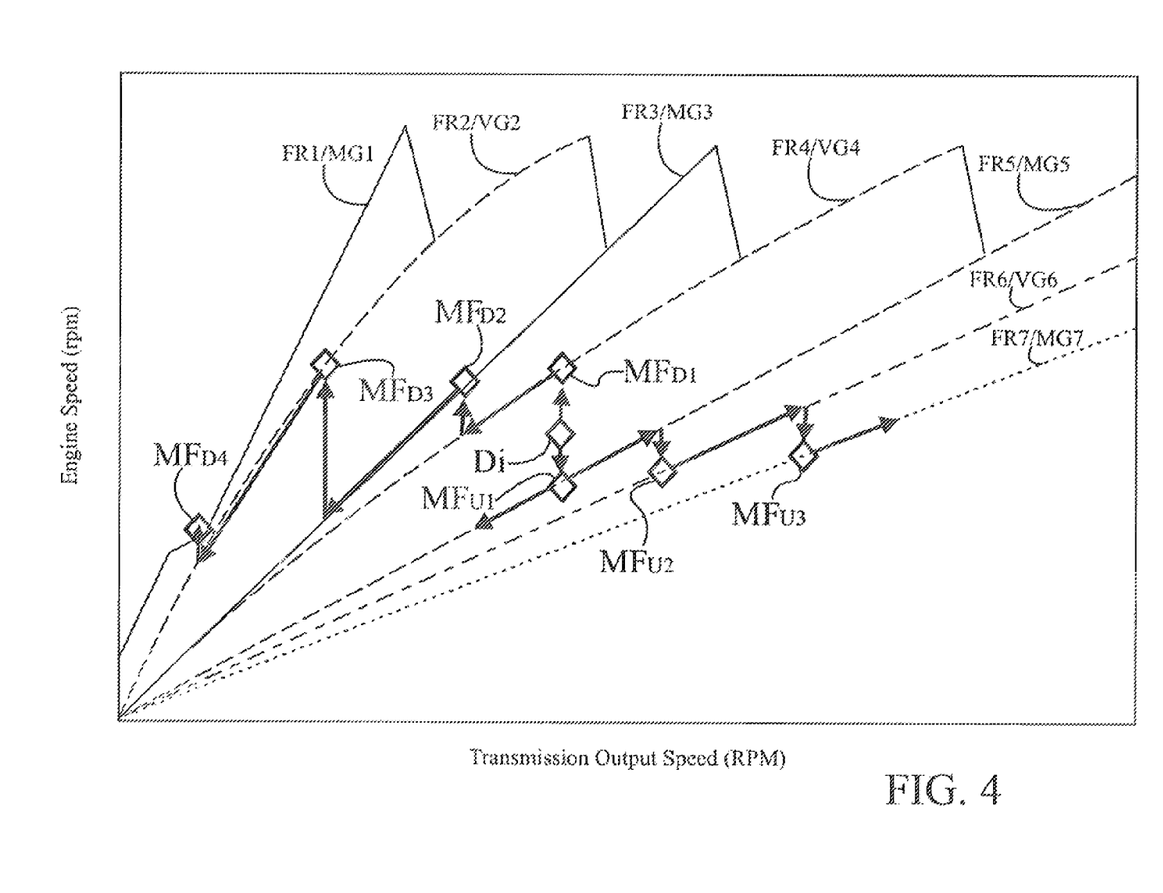
FIG. 4 is a plot of engine speed versus transmission output speed for the hybrid powertrain of FIG. 1, including plots of fixed speed relationships within a manual fixed speed relationship mode, and illustrating a change from a continuously variable speed relationship mode to the manual fixed speed relationship mode, and further illustrating shifts between the fixed speed relationships.

Referring now to FIGS. 1 and 4, the transmission 34 can be operated in the manual fixed speed relationship mode to improve acceleration by increasing the powertrain torque output. Also, in normal Drive mode operation of the powertrain 12, engine speed is held constant during acceleration and the engine 30 thus produces a constant sound that many drivers may find unfamiliar. Accordingly, the manual fixed speed relationship mode can provide the sound and feel of manual transmission gearshifts.

In a first example, transmission operation can start in the manual fixed speed relationship mode, for example, where the driver requests transmission operation in the manual fixed speed relationship mode, such as by using the driver interface 16 in any suitable maimer. For instance, the driver can move the gearshift lever from the Park setting into the first fixed speed relationship setting FR1 of the manual fixed speed relationship mode. Thereafter, the transmission output speed is proportional to the engine speed according to the first fixed speed relationship FR1 for all engine speeds until, for example, the driver upshifts to the second fixed speed relationship FR2 or moves the gearshift lever to the Drive D setting or automatic fixed speed relationship setting AF, or the like. In order words, based on the driver request, the engine speed becomes limited to engine speeds along the first fixed speed relationship FR1 as a function of transmission output speed.

In a second example, and as illustrated by the instantaneous speed relationship $D_i$ of FIG. 4, by default, transmission operation may be in the CV speed relationship modes and can be switched manually into the manual fixed speed relationship mode by the driver using the driver interface 16 in any suitable manner. For instance, the driver can bump the gearshift lever from its Drive setting into a + or − setting or can toggle a +/− selector or paddle Into a + or − setting or the like, to request an upshift or a downshift Into an adjacent manual fixed speed relationship. In short, any suitable method and apparatus may be used to request manual fixed speed relationship mode operation.

Regardless of the particular method and apparatus used to request the manual fixed speed relationship mode, based on the upshift or downshift request, a fixed speed relationship to be shifted into from the Drive mode is determined. For example, the control system 56 can receive the request and make the determination, first, the instantaneous variable speed relationship $D_i$ of the transmission is determined. Then, a fixed speed relationship adjacent the instantaneous variable speed, relationship $D_i$ and generally in the direction of the requested upshift or downshift is identified. Thereafter, the transmission is adjusted to operate according to the fixed speed relationship in any suitable manner. Subsequently, engine speed is increased to a value corresponding to present transmission output speed as a function of the identified fixed speed relationship. For example, in FIG. 4 an exemplary downshift to manual fixed speed relationship request $MF_{D1}$ involves quickly increasing the engine speed from the speed corresponding to the exemplary speed relationship $D_i$ to a value along the fourth fixed speed relationship FR4 line adjacent and above the speed relationship $D_i$. Thereafter, and as indicated by the arrows emanating from the downshift request $MF_{D1}$, the transmission 34 is operated in accordance with that relationship FR4 for all transmission Input speeds until the driver requests otherwise. For example, the driver can request a second downshift $MF_{D2}$ such as to a fixed speed relationship FR3, or an upshift $MF_{D1}$ to a fixed speed relationship FR5, or the driver can request a shift back to the Drive mode such as by holding the gearshift lever in the + or the − setting for a predetermined period such as about 100 ms or more. Likewise, the transmission 34 is operated in accordance with those ratios FR3 or FR5 for ail transmission input speeds until, for example, subsequent downshifts $MF_{D3}$, $MF_{D4}$, or upshifts $MF_{U2}$, $MF_{U3}$, are requested, or until the driver requests a shift back to the Drive mode such as by moving the gearshift lever Into the Drive setting. The vehicle does not have to change speed to achieve the shifts.

Still referring to FIGS. 1, 3, and 4, the automatic fixed speed relationship mode AF may Include the fixed speed relationships FR1-PR7, Including the mechanical gear ratios MG1, MG3, MG5, MG7 and virtual gear relationships VG2, VG4, VG6. In the automatic fixed speed relationship mode AF, the control system 56 can automatically select between the multiple fixed speed relationships FR1-FR7 for providing a suitable speed relationship between the transmission output 35 and input 33. The transmission 34 can be operated in the automatic fixed speed relationship mode AF to improve acceleration by increasing powertrain output, to provide the feel of conventional automatic transmission shifts, and/or to balance powertrain efficiency with increased driver vehicle performance demands.

In a first example, transmission operation can start in the automatic fixed speed relationship mode AF, for example, where the driver requests transmission operation in the automatic fixed speed relationship mode AF, such as by using the driver interface 16 in any suitable manner. For instance, the driver can move a gearshift lever from Park into the automatic fixed speed relationship setting AF. Thereafter, the transmission output speed is proportional to the engine speed according to the first fixed speed relationship FR1 for all engine speeds until, for example, the control system 56 determines that the transmission 34 should be upshifted into the second fixed speed relationship FR2, or until the driver manually upshifts to the second fixed speed relationship FR2 by moving the gearshift selector to an FR2 setting or bumping the gearshift selector to a + setting, or until the driver moves the gearshift lever to Drive D, or the like.

Figure 5:
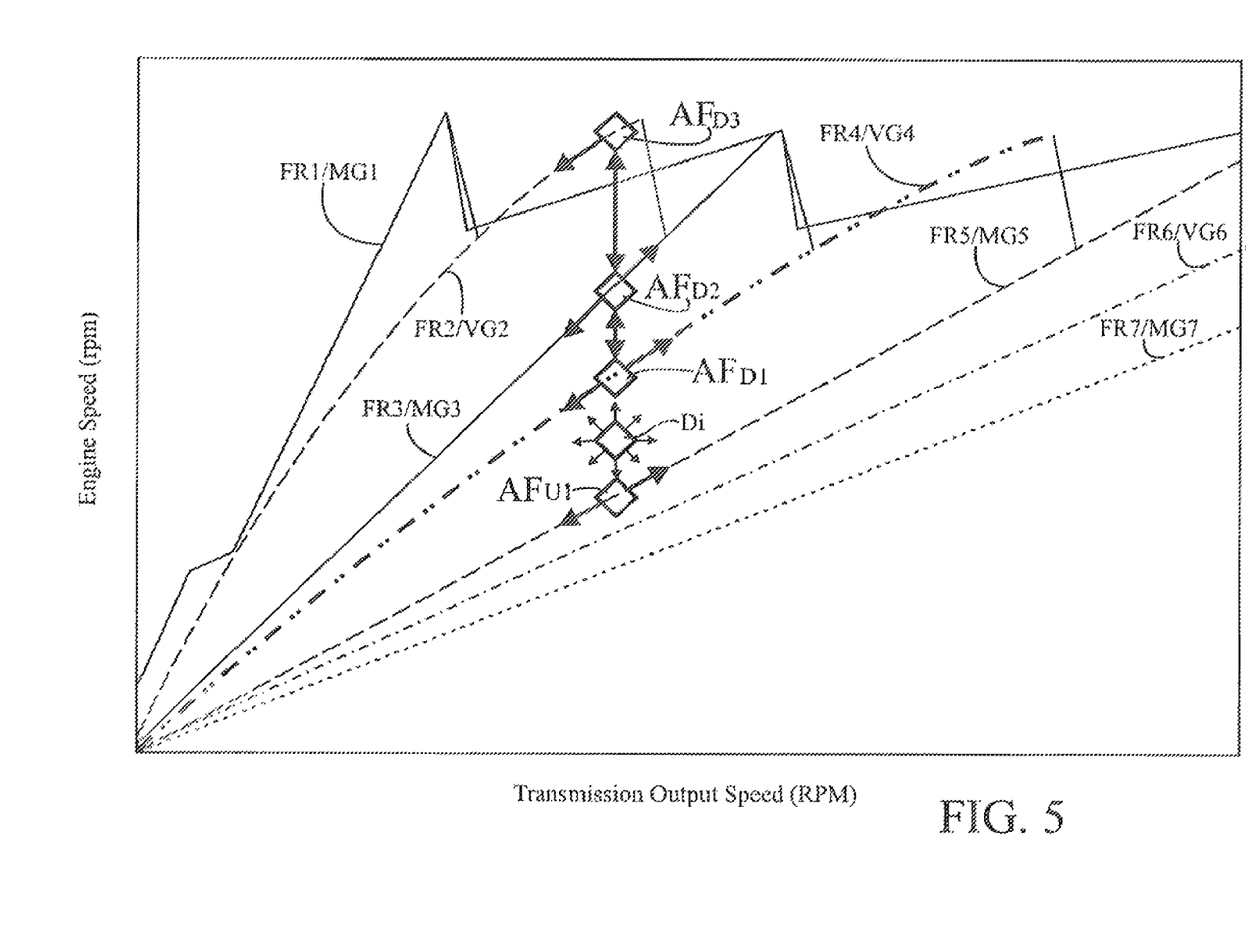
FIG. 5 is a plot of engine speed versus transmission output speed for the hybrid powertrain of FIG. 1, including plots of fixed speed relationships within an automatic fixed speed relationship mode, and illustrating a change from a continuously variable speed relationship mode to the automatic fixed speed relationship mode.

In a second example, and as illustrated by the exemplary speed relationship $D_i$ in FIG. 5, by default, transmission operation can be in the CV speed relationship mode and can be switched automatically into the automatic fixed speed relationship mode AF. For instance, the transmission 34 can be upshifted automatically from the first CV speed relationship mode to the third fixed speed relationship FR3 such as in response to request from the driver, for example, where the driver bumps a gearshift selector in a positive direction to request an upshift in speed relationship. In another instance, the transmission 34 can be shifted automatically from the third fixed speed relationship FR3 to the fourth fixed speed relationship FR4 defined within the second CV speed relationship range R2. For example, this may happen when the vehicle speed is ever increasing from a stand still and the transmission 34 is being upshifted through fixed speed relationships in the automatic fixed speed relationships mode. In a further instance, the shift can be made in response to a sudden demand in acceleration from the driver, for example, where the driver "floors" an accelerator pedal from a vehicle standstill condition.

In this latter instance, the control system 56 can infer from such aggressive driver action that the driver is requesting to exit the Drive mode and enter the AF mode. The control system 56 receives signals from the transmission mode selector sensor, the accelerator position sensor, and the vehicle speed sensor and can determine instantaneous powertrain torque demand as a function of such signals. For example, the control system 56 may calculate the rate of change of the accelerator position, which rate may represent desired acceleration by the vehicle driver, and is indicative of powertrain torque demand. The control system 56 can also determine torque available from the powertrain 12. Those of ordinary skill in the art will recognize that the torque demand and torque available may be derived from actual values obtained from vehicle and/or powertrain sensors alone, or in combination with one or more torque and/or acceleration threshold values, formulas, look-up tables, PID algorithms, and/or the like. In any case, the control system 56 can compare torque demand with, torque available from the engine 30 and the transmission 34 at its present speed relationship.

If the control system 56 determines that the instantaneous torque demand exceeds the instantaneous torque available from the engine 30 and the transmission 34 within its present instantaneous speed relationship $D_i$ in the Drive mode, then the control system 56 can command a downshift from the present instantaneous speed relationship $D_i$ to a lower mechanical or virtual gear relationship. More specifically, the control system 56 may effect the downshift by transmitting suitable signals to suitable transmission speed relationship changing devices such as electro-hydraulic solenoid valves within the transmission 34 so as to apply or disengage suitable couplings associated with suitable gear sets. Also, or instead, the control system 56 may transmit suitable control signals to the motor control controller 54 to adjust the speed and/or torque of one or both of the motors 42, 44. If, however, the control system 56 determines that the instantaneous torque demand does not exceed the amount of torque available from the engine 30 and the transmission 34 within its present speed relationship in the Drive mode, then the control system 56 can continue to control the engine 30 and transmission 34 according to normal operating parameters within the Drive mode. For example, the control system 56 may suitably adjust the engine throttle and/or fuel injectors to increase engine output, and/or may suitable adjust motor torque and/or speed.

According to another aspect, a driver can select a preferred speed relationship schedule, such as Economy or Sport speed relationship schedules. The schedules correspond to Economy or Sport modes, which can be provided by the driver interface 16, such as part of a gearshift selector or pushbuttons of a transmission mode selector, or the like. In the normal transmission Drive mode, powertrain operation is optimized for a balance between good fuel economy and good powertrain performance. But the present powertrain 12 also provides a driver with options to prioritize relatively better powertrain performance or relatively better fuel economy. The control system 56 can execute any suitable Economy or Sport speed relationship programs or shift schedules to operate the powertrain 12 to optimize Economy or Sport mode goals, wherein the control system 56 processes suitable inputs according to a program to define and output target engine and/or motor input speeds to achieve such goals.

In the Sport mode, the transmission 34 is operated according to a Sport shift, schedule to shift between the fixed speed relationships FR1-FR7 so as to maximize powertrain torque output for good acceleration. According to the Sport mode, the control system 56 places the transmission 34 in the automatic fixed speed relationship mode, and thereafter executes a Sport shift schedule that maintains the transmission 34 in a given fixed speed relationship until the torque conveyed in the current relationship is substantially the same as the torque that will be conveyed in the next relationship at the instant an upshift is made from the current relationship to the next relationship. The Sport shift schedule can be different from a default shift schedule normally used in the automatic fixed speed relationships mode.

In the Economy mode, the transmission 34 is operated according to an Economy speed relationship program or shift schedule that adjusts the transmission speed relationship so as to minimize energy usage for good fuel economy and electrical efficiency. According to the Economy mode, die control system 56 places the transmission 34 in either the Drive mode D or the automatic fixed speed relationship mode AF. If the transmission 34 is placed In the Drive mode D, then the Economy speed relationship program can be die same as the normal Drive mode program, or can be a different, more economical speed relationship program than a default Drive mode program to maximize fuel economy at the expense of powertrain performance. For example, the control system 56 can maintain the engine 30 at a substantially steady state such as within its most fuel efficient area of its fuel economy map, and can adjust transmission input speed by varying power input of one of the motors 42, 44 by operating the motors 42, 44 in their respective most efficient areas of their motor efficiency maps. But if the transmission 34 is placed in the AF mode, then the control system 56 can execute an Economy shift schedule that maintains the transmission 34 in a given fixed speed relationship until fuel economy within that relationship is maximized after which the transmission 34 is shifted to the next relationship, and so on. The Economy speed relationship program can be different from a default speed relationship program normally used in the automatic fixed speed relationships mode or the CV mode.

Figure 6:
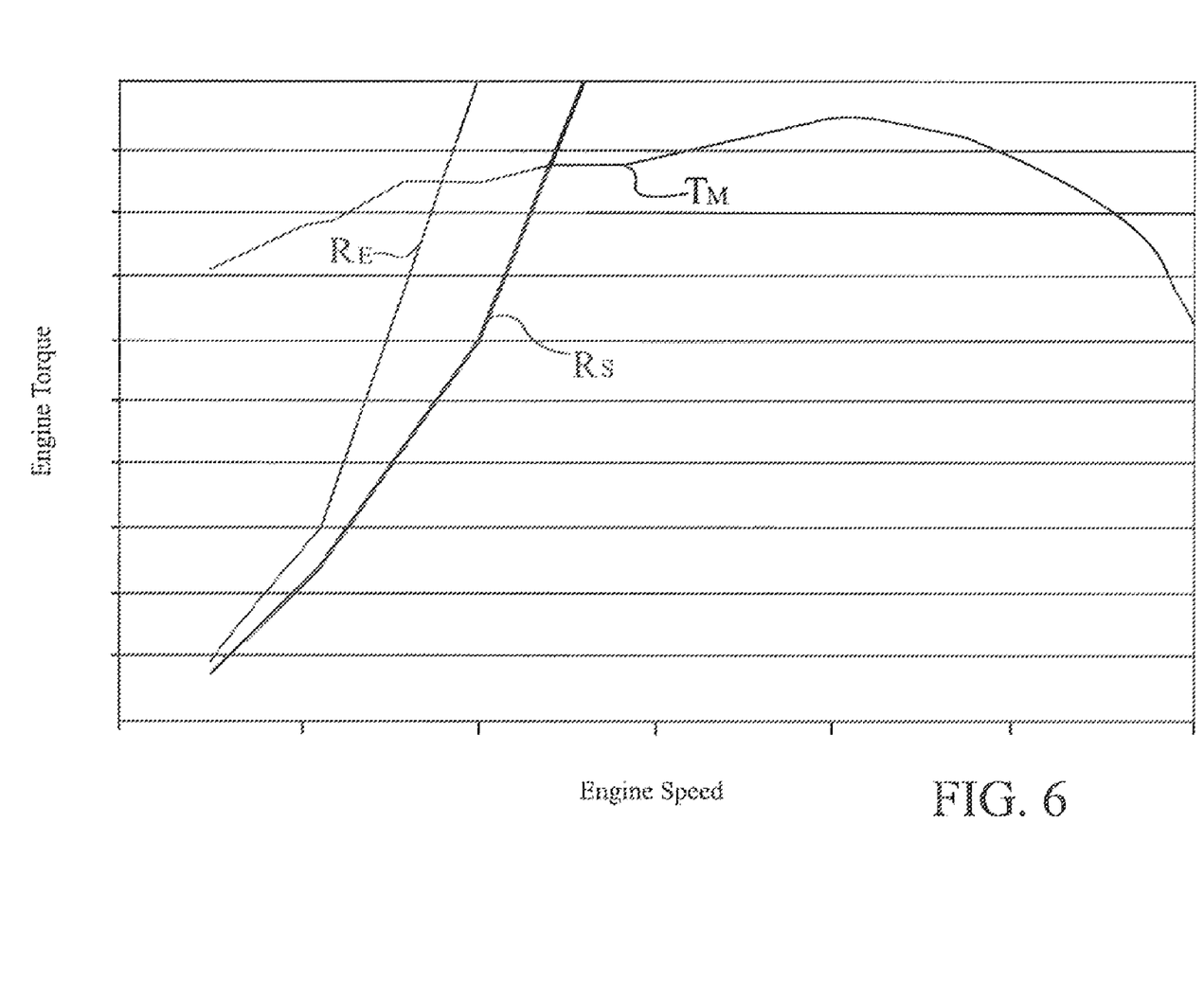
FIG. 6 is a plot of engine torque versus engine speed and illustrates torque reserve limits associated with Economy and Sport modes.

Referring now to FIG. 6, the Sport and Economy modes can incorporate different respective Sport and Economy engine torque reserves $R_S$, $R_E$. Generally, torque reserve relates to the quantity of torque the powertrain can spare at any given moment in time before maximum available torque output is reached, so that the vehicle can suddenly accelerate, or climb a slope at a uniform speed. In other words, torque reserve is the ability of the powertrain to add torque within a given speed relationship to compensate for a sudden increase in torque demand.

The Sport mode torque reserve $R_S$ can be larger than the Economy mode torque reserve $R_E$. This is because the Sport mode upshifts take place "later" at a relatively higher engine torque and speed for better acceleration, whereas Economy mode upshifts occur "earlier" at relatively lower engine torque and engine speed to conserve fuel. Accordingly, in the Sport mode, the control system 56 adjusts shift characteristics toward higher shift speeds, thereby resulting in a relatively greater torque reserve. The torque reserves $R_S$, $R_E$ can be different from default torque reserves in the automatic fixed speed relationships mode or Drive mode.

From the above, those skilled in the art will now appreciate that the powertrain 12 improves driver satisfaction. Compared to existing powertrains having hybrid transmissions, the powertrain 14 provides the sound and feel of a conventional transmission and better "gas pedal" response in the MP mode and/or the Sport mode within the AF mode, and provides as good or better fuel economy in die Drive D mode or the Economy mode within the AF or Drive modes.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. For example, the method can be carried out using any suitable transmission architecture and the particular transmission architecture may vary from that shown. For instance, greater or fewer planetary gearsets and couplings can be deployed in similar or different configurations from that shown. Also, within the illustrated configuration, the $1^{st}/3^{rd}$ coupling C4 can be rearranged. For example, the coupling C4 can instead selectively couple the intermediate ring gear 38r to the intermediate sun gear 38s, or the input carrier 36c to the input ring gear 36r. The invention is defined by the following claims.

What is claimed is:

1. A method of operating a hybrid transmission, comprising the steps of:
    controlling the transmission according to a drive mode, which includes a continuously variable speed relationship;
    controlling the transmission according to a fixed speed relationship mode, which includes a plurality of fixed speed relationships including mechanical gear ratios and virtual gear relationships;
    receiving a driver request to upshift or downshift from the continuously variable weed relationship mode to the fixed speed relationship mode;
    determining an instantaneous variable speed relationship of the transmission;
    identifying a fixed speed relationship adjacent the instantaneous variable speed relationship in the direction of the requested upshift or downshift from one of a plurality of mechanical gear ratios and a plurality of virtual gear relationships;
    adjusting the transmission to operate according to the identified fixed speed relationship; and
    increasing engine speed to a value corresponding to present transmission output speed as a function of the identified fixed speed relationship.

2. The method of claim 1 further comprising:
controlling the transmission according to the identified fixed speed relationship for all transmission input speeds until the driver requests otherwise according to a manual, fixed speed relationship mode.

3. The method of claim 1 further comprising:
controlling the transmission according to the identified fixed speed relationship until a control system shifts to another fixed speed relationship according to a shift schedule and an automatic fixed speed relationship mode.

4. The method of claim 1 further comprising:
controlling the transmission according to at least one of a manual or automatic fixed speed relationship mode until the driver requests a return to the continuously variable speed relationship mode.

5. The method of claim 1 wherein the virtual gear relationships are defined at least in part by controlling a speed of at least one transmission electric motor relative to transmission output speed.

6. The method of claim 5 wherein the virtual gear relationships include linear and non-linear fixed speed relationships.

7. The method of claim 1 wherein the mechanical gear ratios are defined by a plurality of planetary gearsets.

8. The method of claim 1 wherein the continuously variable speed relationship is defined by at least one of at least one planetary gearset or at least one transmission electric motor.

9. The method of claim 1 wherein the fixed speed relationship mode is a manual fixed speed relationship mode, in which the driver can manually shift between the mechanical gear ratios and virtual gear relationships.

10. The method of claim 1 wherein the fixed speed relationship mode is an automatic fixed speed relationship mode, in which a control, system automatically shifts between the mechanical gear ratios and virtual gear relationships.

11. The method of claim 1 wherein the mechanical gear ratios and virtual gear relationships include four mechanical gear ratios and three virtual gear relationships to establish the hybrid transmission as a virtual seven speed transmission.

12. The method of claim 11 wherein the mechanical gear ratios and virtual gear relationships include a first, mechanical gear ratio, a second, virtual gear relationship, a third, mechanical gear ratio, a fourth, virtual gear relationship, a fifth, mechanical gear ratio, a sixth, virtual gear relationship, and a seventh, mechanical gear ratio.

13. The method of claim 12 wherein the first, mechanical gear ratio is about 3.89, the second, virtual gear relationship is bounded by about 3.50 to about 2.33, the third, mechanical gear ratio is about 1.80, the fourth, virtual gear relationship is bounded by about 1.61 to about 1.26, the fifth, mechanical gear ratio is about 1.0, the sixth, virtual gear relationship is about 0.85, and the seventh, mechanical gear ratio is about 0.72.

14. A method of operating a hybrid transmission, comprising the steps of:
providing a hybrid transmission comprised of a plurality of planetary gearsets that are each connected to a clutch whose operation is controlled in defining a plurality of mechanical gear ratios when in a fixed speed relationship mode;
receiving a driver request to upshift or downshift from a continuously variable speed relationship mode to the fixed speed relationship mode including a plurality of fixed speed relationships including mechanical gear ratios interspersed with virtual gear relationships;
shifting the transmission into the fixed speed relationship mode; and
wherein the virtual gear relationships are defined at least in part by controlling a speed of at least one electric motor operatively couple to one of the plurality of the planetary gearsets with one of the virtual gear relationships disposed between one pair of mechanical gear ratios and another one of the virtual gear relationships disposed between another pair of mechanical gear ratios.

15. A method of operating a hybrid transmission, comprising the steps of:
controlling the transmission to upshift or downshift from a continuously variable speed relationship mode into a fixed speed relationship mode that includes a plurality of fixed speed relationships comprised of a plurality of mechanical gear ratios and a plurality of virtual gear relationships; and
shifting the transmission into the fixed speed relationship mode wherein (i) each one of the mechanical gear ratios in the fixed speed relationship mode are defined by controlling operation of a plurality of planetary gearsets, and (ii) at least one of the virtual gear relationships in the fixed speed relationship mode is defined by controlling a speed of at least one transmission electric motor relative to transmission output speed.

16. The method of claim 15 wherein the hybrid transmission further comprises a plurality of selective couplings with one of the selective couplings in operable cooperation with one of the planetary gearsets and whose operation is controlled by a controller in providing at least one of the mechanical gear ratios and another of the selective couplings in operable cooperation with another one of the planetary gearsets and whose operation is controlled by the controller in providing at least one other of the mechanical gear ratios.

17. The method of claim 16 wherein there are a plurality of transmission electric motors whose speed is controlled when in fixed speed relationship mode to provide a plurality of virtual gear relationships with one of the virtual gear relationships located between one pair of the plurality of mechanical gear ratios and another one of the virtual gear relationships located between another pair of the plurality of mechanical gear ratios.

* * * * *